(12) United States Patent
Cornelius et al.

(10) Patent No.: US 7,979,746 B2
(45) Date of Patent: Jul. 12, 2011

(54) DUAL-DUAL LOCKSTEP PROCESSOR ASSEMBLIES AND MODULES

(75) Inventors: Brian Cornelius, Glendale, AZ (US); Mitch Fletcher, Glendale, AZ (US); James Alexander Ross, Phoenix, AZ (US); David Scheid, Eau Claire, WI (US)

(73) Assignee: Honeywell International Inc., Morristown, NJ (US)

( * ) Notice: Subject to any disclaimer, the term of this patent is extended or adjusted under 35 U.S.C. 154(b) by 212 days.

(21) Appl. No.: 12/430,658

(22) Filed: Apr. 27, 2009

(65) Prior Publication Data

US 2010/0275065 A1 Oct. 28, 2010

(51) Int. Cl.
*G06F 11/00* (2006.01)
(52) U.S. Cl. ............................. 714/37; 714/30
(58) Field of Classification Search .............. 714/37, 714/30, 11, 12, 13, 733, 734
See application file for complete search history.

(56) References Cited

U.S. PATENT DOCUMENTS

| | | | |
|---|---|---|---|
| 5,398,331 A * | 3/1995 | Huang et al. .................. 714/12 |
| 5,832,294 A | 11/1998 | Reinschmidt | |
| 6,065,135 A * | 5/2000 | Marshall et al. ............... 714/11 |
| 6,389,585 B1 | 5/2002 | Masleid et al. | |
| 6,473,869 B2 | 10/2002 | Bissett et al. | |
| 6,742,145 B2 | 5/2004 | Bailey et al. | |
| 6,883,121 B1 * | 4/2005 | Jensen et al. .................. 714/49 |
| 6,909,303 B2 | 6/2005 | Ogawa | |
| 7,107,484 B2 | 9/2006 | Yamazaki et al. | |
| 2002/0046324 A1 | 4/2002 | Barroso et al. | |
| 2002/0133751 A1 * | 9/2002 | Nair et al. ...................... 714/38 |
| 2004/0153731 A1 | 8/2004 | Aino et al. | |
| 2004/0268044 A1 | 12/2004 | Heller, Jr. et al. | |
| 2005/0120275 A1 * | 6/2005 | Fletcher et al. ................ 714/38 |
| 2005/0240806 A1 | 10/2005 | Bruckert et al. | |
| 2005/0246581 A1 * | 11/2005 | Jardine et al. .................. 714/12 |
| 2006/0107117 A1 * | 5/2006 | Michaelis et al. ............. 714/25 |
| 2006/0242456 A1 * | 10/2006 | Kondo et al. ..................... 714/6 |
| 2008/0126750 A1 | 5/2008 | Sistla | |

* cited by examiner

*Primary Examiner* — Dieu-Minh Le
(74) *Attorney, Agent, or Firm* — Ingrassia Fisher & Lorenz, P.C.

(57) ABSTRACT

Processor assemblies and modules are provided. One processor assembly includes first and second processors, and first and second input/output (I/O) interfaces coupled to the first and second processors. The first and/or second I/O interfaces are configured to compare outputs of the first and second processors, and render the first and second processors inactive if the outputs are different. One processor module includes first and second buses coupled to first and second processor assemblies. The first processor assembly includes first and second processors coupled to first and second I/O interfaces, wherein the first I/O interface is coupled to the first bus and the second I/O interface is coupled to the second bus. The second processor assembly includes third and fourth processors coupled to third and fourth I/O interfaces, wherein the third I/O interface is coupled to the first bus and the fourth I/O interface is coupled to the second bus.

17 Claims, 5 Drawing Sheets

DUAL-DUAL LOCKSTEP PROCESSOR ASSEMBLIES AND MODULES

FIELD OF THE INVENTION

The present invention generally relates to processor assemblies and modules, and more particularly relates to a plurality of processors arranged in a lockstep assembly, and to a plurality of lockstep assemblies arranged in a lockstep module.

BACKGROUND OF THE INVENTION

Redundant processor systems are used in many applications including, for example, aerospace applications. Although redundant processor systems provide a "back-up" processor in the unlikely event that the primary processor malfunctions or experiences an error, current redundant processor systems include back-up processors that use valuable space, consume power when not in use, and often require human interaction to switch from using the primary processor to using the back-up processor.

Accordingly, it is desirable to provide smaller processor assemblies and modules that do not consume power or consume less power when not in use, and are capable of self-activating. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide processor assemblies. One processor assembly comprises a first processor, a second processor, a first input/output interface (I/O I/F) coupled to the first processor and the second processor, and a second I/O I/F coupled to the first processor and the second processor. The first I/O I/F and/or the second I/O I/F are configured to compare outputs of the first and second processors, and render the first and second processors inactive if the outputs are different.

Other embodiments provide processor modules. One processor module comprises a first bus, a second bus, a first processor assembly, and a second processor assembly. The first processor assembly comprises a first processor, a second processor, a first I/O I/F coupled to the first processor, the second processor, and the first bus, and a second I/O I/F coupled to the first processor, the second processor, and the second bus. The second processor assembly comprises a third processor, a fourth processor, a third I/O I/F coupled to the third processor, the fourth processor, and the first bus, and a fourth I/O I/F coupled to the third processor, the fourth processor, and the second bus.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments provide lockstep processor assemblies and modules. Specifically, a plurality of processors arranged in a lockstep assembly and a plurality of lockstep assemblies arranged in a lockstep module are provided. The lockstep processor assemblies and modules may be implemented in, for example, aerospace applications (e.g., aircraft, spacecraft, satellites, spacesuits, etc.) and/or any application that uses redundancy or where redundancy is desired.

Figure 1:
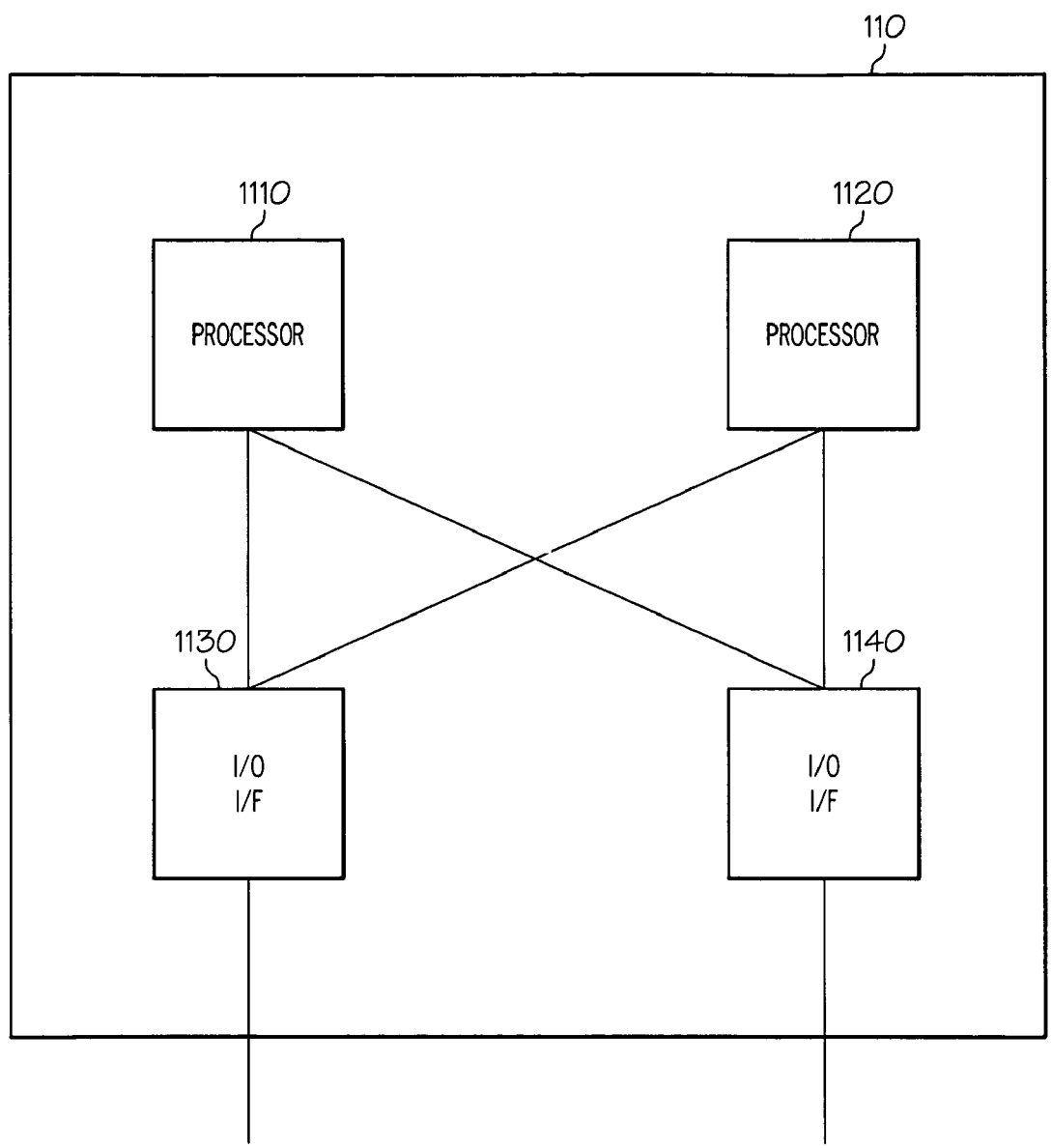
FIG. 1 is a block diagram of one embodiment of a lockstep processor assembly.

Turning now to the figures, FIG. 1 is a block diagram of one embodiment of a processor assembly 110 arranged in a lockstep configuration. At least in the illustrated embodiment, processor assembly 110 comprises a processor 1110 and a processor 1120, each coupled to and in communication with an input/output interface (I/O I/F) 1130 and an I/O I/F 1140.

Processor 1110 may be any processor known in the art or developed in the future that includes glue logic. In one embodiment, processor 1110 is a Power PC 750 processor manufactured by International Business Machines Corporation of Armonk, N.Y. In other embodiments, processor 1110 is a Pentium processor manufactured by Intel Corporation of Santa Clara, Calif. In still other embodiments, processor 1110 is an AMD 29050 processor manufactured by Advance Micro Devices, Inc. of Sunnyvale, Calif.

Processor 1120 may be any processor known in the art or developed in the future that includes glue logic. In one embodiment, processor 1120 is a Power PC 750 processor manufactured by International Business Machines Corporation of Armonk, N.Y. In other embodiments, processor 1120 is a Pentium processor manufactured by Intel Corporation of Santa Clara, Calif. In still other embodiments, processor 1120 is an AMD 29050 processor manufactured by Advance Micro Devices, Inc. of Sunnyvale, Calif.

Together, processors 1110 and 1120 form a redundant pair of self-checking processors including glue logic. That is, processors 1110 and 1120 are arranged in a high-integrity configuration that is capable of self-diagnosis to enable processor assembly 110 to entirely shut down or follow a predefined recovery algorithm when a fault is detected.

In one embodiment, processors 1110 and 1120 are the same type of processors using the same software. In another embodiment, processors 1110 and 1120 are different types of processors using the same software. In yet another embodiment, processors 1110 and 1120 are the same type of processors using different software. In still another embodiment, processors 1110 and 1120 are different types of processors using different software.

I/O I/F 1130 and I/O I/F 1140 may each be any input/output interface known in the art or developed in the future that enables processors 1110 and 1120 to interface with other devices (e.g., a field-programmable gate array (FPGA)). Specifically, I/O I/F 1130 and I/O I/F 1140 are arranged redundantly such that I/O I/F 1130 can be used in the unlikely event that I/O I/F 1140 malfunctions and vice versa.

In one embodiment, I/O I/F 1130 and/or I/O I/F 1140 are configured to compare the outputs of processors 1110 and 1120 and render processors 1110 and 1120 inactive if the outputs do not match. In other words, if processors 1110 and 1120 have different outputs, I/O I/F 1130 and/or I/O I/F 1140 are configured to shut down processor assembly 110.

Figure 2:
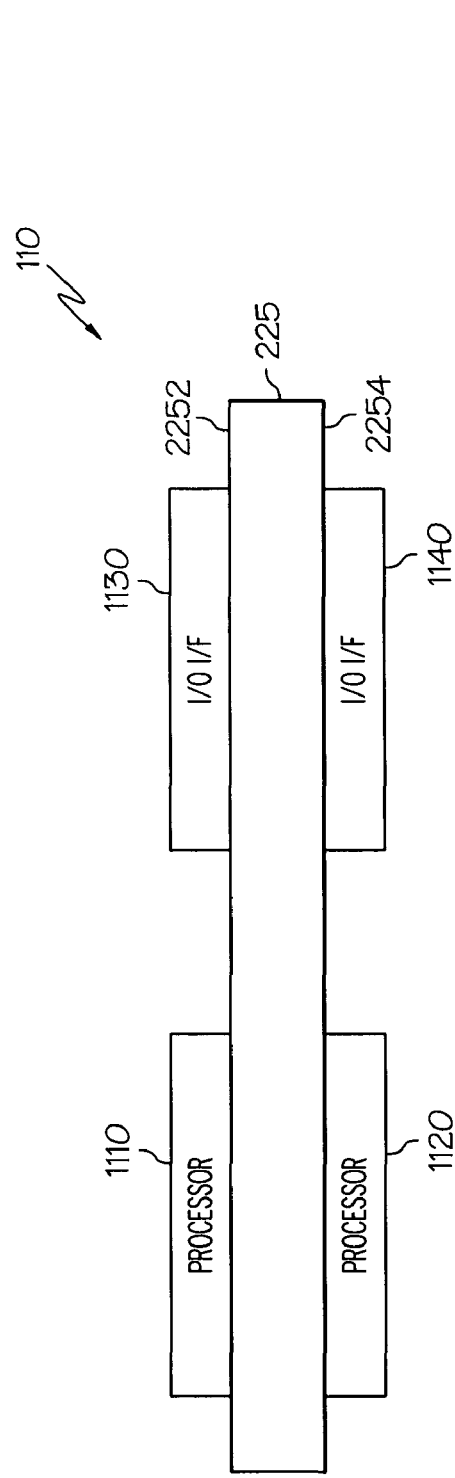
FIG. 2 is a diagram of one embodiment of the lockstep processor assembly of FIG. 1 arranged on a substrate.

FIG. 2 is a diagram of one embodiment of processor assembly 110 arranged on a substrate 225. Substrate 225 includes sides 2252 and 2254, and may be any substrate known in the art or developed in the future.

As illustrated in FIG. 2, processor 1110 and I/O I/F 1130 are arranged on different sides of substrate 225 than processor 1120 and I/O I/F 1140. Specifically, processor 1110 and I/O I/F 1130 are arranged on side 2252, while processor 1120 and I/O I/F 1140 are arranged on side 2254. As one skilled in the art will recognize, processor assembly 110 may include a different topology than the embodiment of illustrated in FIG. 2 as long as processor 1110 and I/O I/F 1130 are arranged on the same side of substrate 225, processor 1120 and I/O I/F 1140 are arranged on the same side of substrate 225, and the combination of processor 1110 and I/O I/F 1130 are on different sides of substrate 225 than the combination of processor 1120 and I/O I/F 1140.

Figure 3:
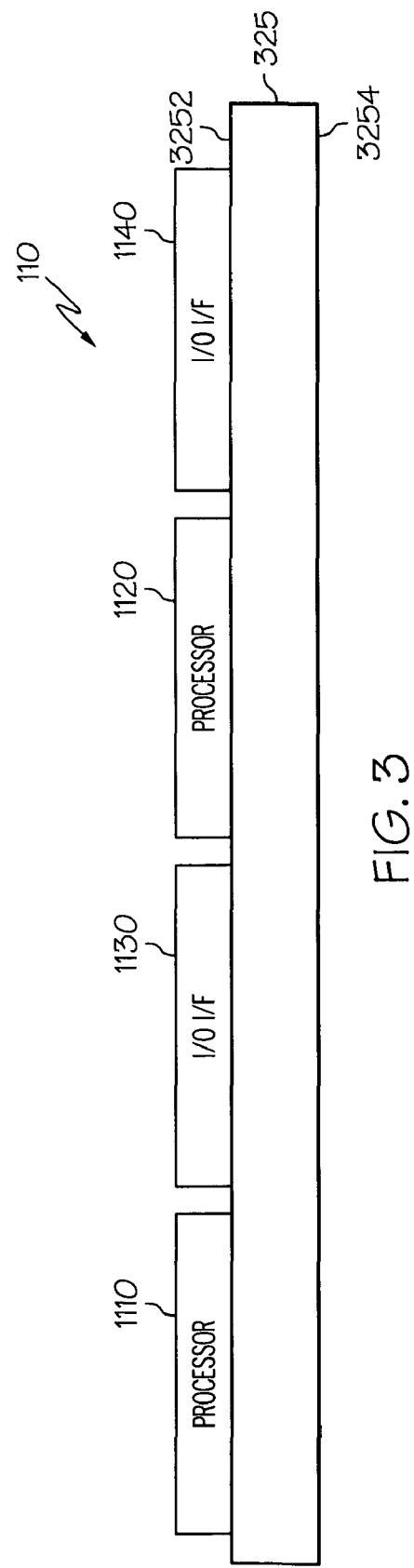
FIG. 3 is a diagram of another embodiment of the lockstep processor assembly of FIG. 1 arranged on a substrate.

FIG. 3 is a diagram of another embodiment of processor assembly 110 arranged on a substrate 325. As illustrated in FIG. 3, processor 1110, processor 1120, I/O I/F 1130, and I/O I/F 1140 are arranged on the same side of substrate 325. As one skilled in the art will recognize, processor assembly 110 may include a different topology than the embodiment of illustrated in FIG. 3 as long as processor 1110, processor 1120, I/O I/F 1130, and I/O I/F 1140 are arranged on the same side of substrate 325.

Figure 4:
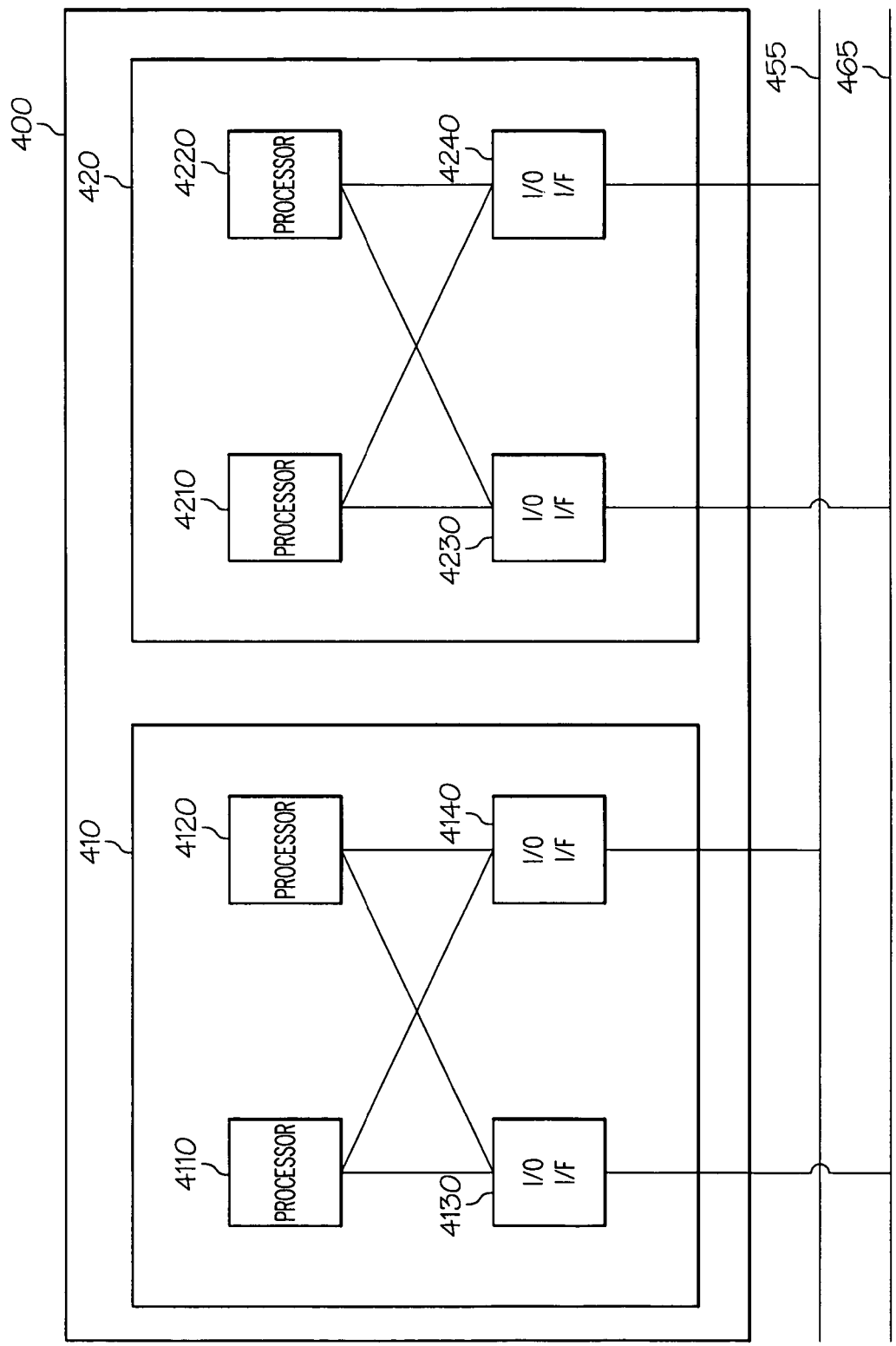
FIG. 4 is a block diagram of one embodiment of a lockstep processor module.

FIG. 4 is a block diagram of one embodiment of a processor module 400 in a lockstep configuration. At least in the illustrated embodiment, processor module 400 comprises a processor assembly 410, a processor assembly 420, a bus 455 (e.g., a wired and/or wireless bus) coupled to processor assemblies 410 and 420, and a bus 465 (e.g., a wired and/or wireless bus) coupled to processor assemblies 410 and 420.

At least in the illustrated embodiment, processor assembly 410 comprises a processor 4110 and a processor 4120, each coupled to and in communication with an I/O interface I/F 4130 and an I/O I/F 4140.

Processor 4110 may be any processor known in the art or developed in the future that includes glue logic. In one embodiment, processor 4110 is a Power PC 750 processor manufactured by International Business Machines Corporation of Armonk, N.Y. In other embodiments, processor 4110 is a Pentium processor manufactured by Intel Corporation of Santa Clara, Calif. In still other embodiments, processor 4110 is an AMD 29050 processor manufactured by Advance Micro Devices, Inc. of Sunnyvale, Calif.

Processor 4120 may be any processor known in the art or developed in the future that includes glue logic. In one embodiment, processor 4120 is a Power PC 750 processor manufactured by International Business Machines Corporation of Armonk, N.Y. In other embodiments, processor 4120 is a Pentium processor manufactured by Intel Corporation of Santa Clara, Calif. In still other embodiments, processor 4120 is an AMD 29050 processor manufactured by Advance Micro Devices, Inc. of Sunnyvale, Calif.

Together, processors 4110 and 4120 form a redundant pair of self-checking processors including glue logic. That is, processors 4110 and 4120 are arranged in a high-integrity configuration that is capable of self-diagnosis to enable processor assembly 410 to entirely shut down or follow a predefined recovery algorithm when a fault is detected.

In one embodiment, processors 4110 and 4120 are the same type of processors using the same software. In another embodiment, processors 4110 and 4120 are different types of processors using the same software. In yet another embodiment, processors 4110 and 4120 are the same type of processors using different software. In still another embodiment, processors 4110 and 4120 are different types of processors using different software.

I/O I/F 4130 and I/O I/F 4140 may each be any input/output interface known in the art (e.g., an FPGA) or developed in the future that enables processors 4110 and 4120 to interface with other devices. Specifically, I/O I/F 4130 and I/O I/F 4140 are arranged redundantly such that I/O I/F 4130 can be used in the unlikely event that I/O I/F 4140 malfunctions and vice versa.

In one embodiment, I/O I/F 4130 and/or I/O I/F 4140 are configured to compare the outputs of processors 4110 and 4120 and render processors 4110 and 4120 inactive if the outputs do not match. In other words, if processors 4110 and 4120 have different outputs, I/O I/F 4130 and/or I/O I/F 4140 are configured to shut down processor assembly 410.

Processor assembly 420, at least in the illustrated embodiment, comprises a processor 4210 and a processor 4220, each coupled to and in communication with an input/output (I/O) interface (I/F) 4230 and an I/O I/F 4240.

Processor 4210 may be any processor known in the art or developed in the future that includes glue logic. In one embodiment, processor 4210 is a Power PC 750 processor manufactured by International Business Machines Corporation of Armonk, N.Y. In other embodiments, processor 4210 is a Pentium processor manufactured by Intel Corporation of Santa Clara, Calif. In still other embodiments, processor 4210 is an AMD 29050 processor manufactured by Advance Micro Devices, Inc. of Sunnyvale, Calif.

Processor 4220 may be any processor known in the art or developed in the future that includes glue logic. In one embodiment, processor 4220 is a Power PC 750 processor manufactured by International Business Machines Corporation of Armonk, N.Y. In other embodiments, processor 4220 is a Pentium processor manufactured by Intel Corporation of Santa Clara, Calif. In still other embodiments, processor 4220 is an AMD 29050 processor manufactured by Advance Micro Devices, Inc. of Sunnyvale, Calif.

Together, processors 4210 and 4220 form a redundant pair of self-checking processors including glue logic. That is, processors 4210 and 4220 are arranged in a high-integrity configuration that is capable of self-diagnosis to enable processor assembly 420 to entirely shut down or follow a predefined recovery algorithm when a fault is detected.

In one embodiment, processors 4210 and 4220 are the same type of processors using the same software. In another embodiment, processors 4210 and 4220 are different types of processors using the same software. In yet another embodiment, processors 4210 and 4220 are the same type of processors using different software. In still another embodiment, processors 4210 and 4220 are different types of processors using different software.

In a further embodiment, processors 4110, 4120, 4210, and 4220 are the same type of processors using the same software. In another embodiment, at least two of processors 4110, 4120, 4210, and 4220 are different types of processors using the same software. In yet another embodiment, at least three of processors 4110, 4120, 4210, and 4220 are different types of processors using the same software. In still another embodiment, each of processors 4110, 4120, 4210, and 4220 are different types of processors using the same software.

In yet a further embodiment, processors 4110, 4120, 4210, and 4220 are the same type of processors using different software. In another embodiment, at least two of processors 4110, 4120, 4210, and 4220 are the same type of processor using different software. In yet another embodiment, at least three of processors 4110, 4120, 4210, and 4220 are the same type of processor using different software. In still another embodiment, processors 4110, 4120, 4210, and 4220 are the same type of processor using different software.

I/O I/F 4230 and I/O I/F 4240 may each be any input/output interface known in the art or developed in the future that enables processors 4210 and 4220 to interface with other devices (e.g., a field-programmable gate array (FPGA)). Specifically, I/O I/F 4230 and I/O I/F 4240 are arranged redundantly such that I/O I/F 4230 can be used in the unlikely event that I/O I/F 4240 malfunctions and vice versa.

In one embodiment, I/O I/F 4230 and/or I/O I/F 4240 are configured to compare the outputs of processors 4210 and 4220 and render processors 4210 and 4220 inactive if the outputs do not match. In other words, if processors 4210 and 4220 have different outputs, I/O I/F 4230 and/or I/O I/F 4240 are configured to shut down processor assembly 4220.

Processor assemblies 410 and 420 are arranged in a high-integrity configuration that is capable of self-diagnosis. Specifically, processor assemblies 410 and 420 are configured such that when processor assembly 410 or processor assembly 420 is active (or ON), the other processor assembly is inactive such that the inactive processor assembly does not consume power or consumes less power than when otherwise active (e.g., consumes a "standby" amount of power). That is, processor assembly 410 and processor assembly 420 are each configured to monitor themselves for errors/malfunctions when they are active and to take themselves offline in the unlikely event that an error or malfunction is detected. In other words, processor assembly 410 and processor assembly 420 are configured to make the decision to go offline or inactive, which actives the other processor assembly.

To activate themselves during inactivity, processor assemblies 410 and 420 are configured to use a watchdog timer (e.g., receive a period heartbeat for the other processor assembly), a prescribed period check, and/or the like monitoring process to determine if the other processor assembly continues to be active. If the inactive processor assembly determines that the other processor assembly is no longer active, the inactive processor assembly may initiate a reboot of processor module 400 to activate itself, switch ON and OFF processor module 400 to activate itself, or use any other technique capable of activating itself.

For example, if processor assembly 410 is active (and processor assembly 420 is inactive) and processor assembly 410 self-determines an error or malfunction in processor assembly 410, processor assembly 410 takes itself offline (i.e., goes inactive). Processor assembly 420 then detects that processor assembly 410 is offline and activates itself using one or more of the detection and/or activation techniques discussed above.

Furthermore, one skilled in the art will appreciate that when processor assemblies 410 and 420 are inactive, each processor within the processor assembly is inactive. Specifically, when processor assembly 410 is inactive, processors 4110 and 4120 are both inactive. Likewise, when processor assembly 420 is inactive, processors 4210 and 4220 are both inactive. Moreover, when processor assembly 410 is active, processor 4110 and processor 4120 are active. Likewise, when processor assembly 420 is active, processor 4210 and processor 4220 are active.

Figure 5:
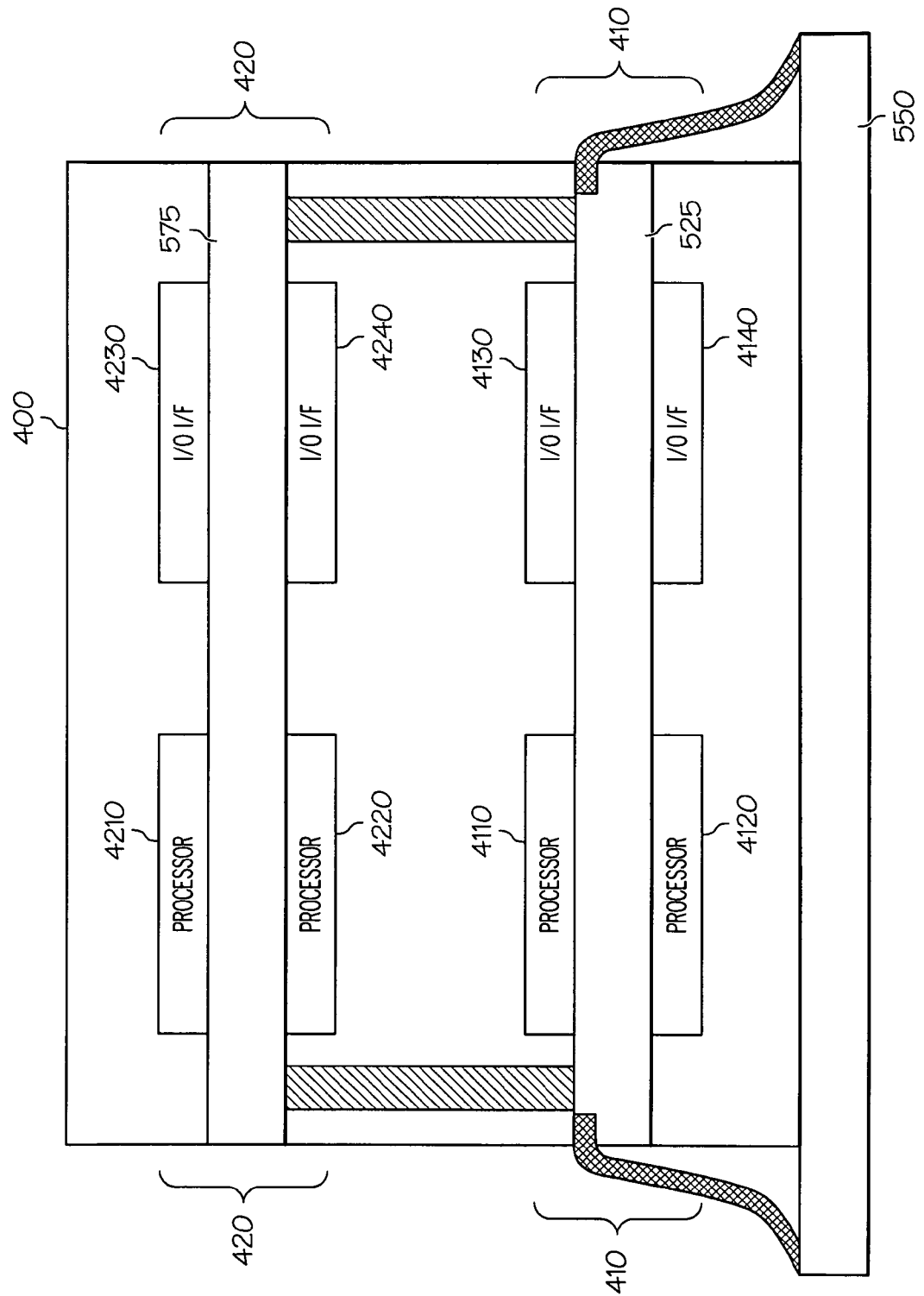
FIG. 5 is a diagram of one embodiment of the lockstep processor module of FIG. 4 arranged in a stack configuration.

FIG. 5 is a diagram of one embodiment of processor module 400 arranged in a stack configuration on a substrate 550. At least in the illustrated embodiment, processor assemblies 410 and 420 are both configured similar to the embodiment of processor assembly 110 illustrated in FIG. 2. Specifically, processor 4110 and I/O I/F 4130 are arranged on different sides of a substrate 525 than processor 4120 and I/O I/F 4140. Similarly, processor 4210 and I/O I/F 4230 are arranged on different sides of substrate 575 than processor 4220 and I/O I/F 4240.

In the embodiment illustrated in FIG. 5, processor assembly 410 is arranged on substrate 550 and processor assembly 420 is stacked on processor assembly 410. As one skilled in art will appreciate, processor assembly 420 can be arranged on substrate 550 and processor assembly 410 stacked on processor assembly 420.

Figure 6:
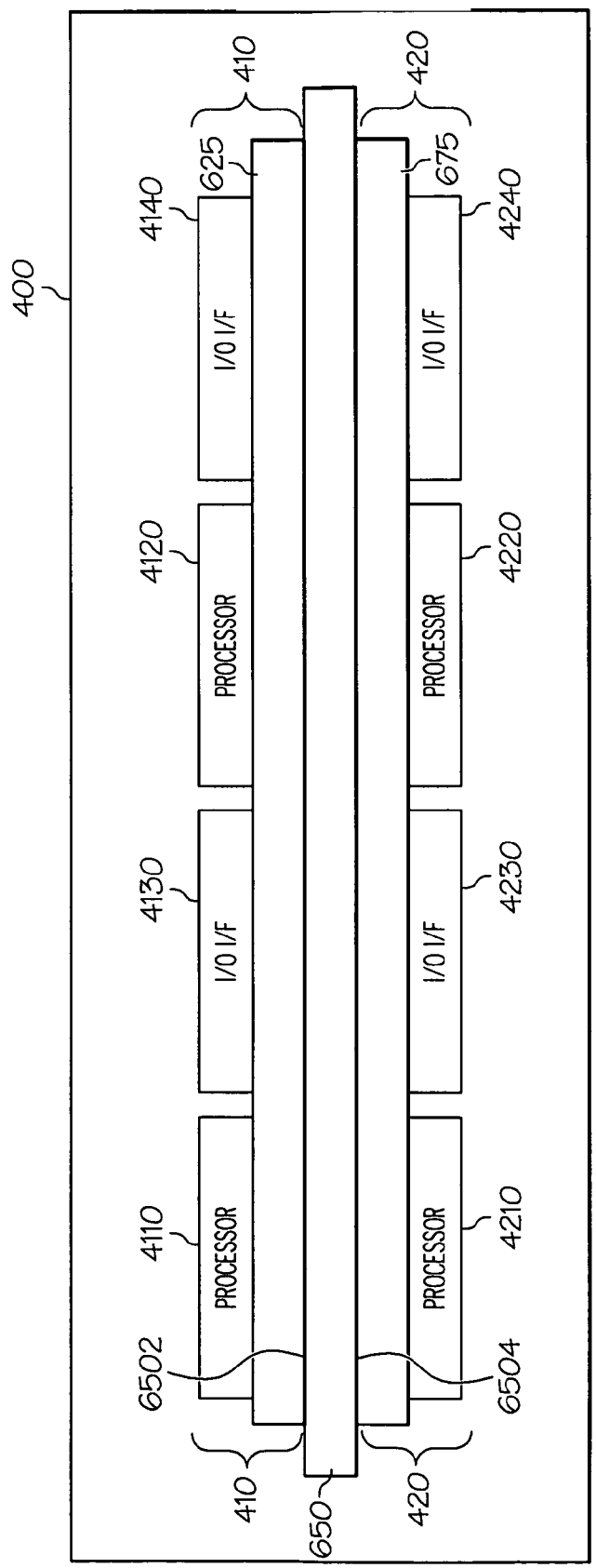
FIG. 6 is diagram of another embodiment of the lockstep processor module of FIG. 4 arranged in a sandwich configuration.

FIG. 6 is a diagram of one embodiment of processor module 400 arranged in a stack configuration on a substrate 650 includes opposite sides 6502 and 6504. At least in the illustrated embodiment, processor assemblies 410 and 420 are both configured similar to the embodiment of processor assembly 110 illustrated in FIG. 3. Specifically, processor 4110, processor 4120, I/O I/F 4130, and I/O I/F 4140 are arranged on the same side of a substrate 625. Similarly, processor 4210, processor 4220, I/O I/F 4230, and I/O I/F 4240 are arranged on the same side of a substrate 675.

In the embodiment illustrated in FIG. 6, processor assembly 410 is arranged on side 6502 and processor assembly 420 is arranged on side 6504. As one skilled in art will appreciate, processor assembly 410 can be arranged on side 6504 and processor assembly 420 can be arranged on side 6502.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A processor assembly, comprising:
   a first processor;
   a second processor;
   a first input/output (I/O) interface coupled to the first processor and the second processor;
   a second I/O interface coupled to the first processor and the second processor, wherein the first I/O interface, the second I/O interface, or both are configured to:
   compare outputs of the first and second processors, and render the first and second processors inactive if the outputs are different; and
   a substrate including a first side and a second side, wherein the first processor and the first I/O interface are arranged on the first side and the second processor and the second I/O interface are arranged on the second side.

2. The processor assembly of claim 1, wherein the first and second processors are the same type of processor or different types of processors using the same software.

3. The processor assembly of claim 1, wherein the first and second processors are self-monitoring, self-activating processors.

4. A processor module, comprising:
a first bus;
a second bus;
a first processor assembly, comprising:
  a first processor,
  a second processor,
  a first input/output (I/O) interface coupled to the first processor, the second processor, and the first bus, and
  a second I/O interface coupled to the first processor, the second processor, and the second bus, wherein the first processor assembly is configured to be inactive when the second processor assembly is active such that the first processor assembly does not consume power or consumes a reduced amount of power while inactive; and
a second processor assembly, comprising:
  a third processor,
  a fourth processor,
  a third I/O interface coupled to the third processor, the fourth processor, and the first bus, and
  a fourth I/O interface coupled to the third processor, the fourth processor, and the second bus, wherein the second processor assembly is configured to be inactive when the first processor assembly is active such that the second processor assembly does not consume power or consumes a reduced amount of power while inactive.

5. The processor module of claim 4, further comprising a first substrate, wherein the first processor assembly and the second processor assembly are arranged on the first substrate in a stack configuration.

6. The processor module of claim 5, wherein:
the first processor assembly further comprises a second substrate including a first side and a second side, wherein the first processor and the first I/O interface are arranged on the first side and the second processor and the second I/O interface are arranged on the second side; and
wherein the second processor assembly further comprises a third substrate including a third side and a fourth side, wherein the third processor and the third I/O interface are arranged on the third side and the fourth processor and the fourth I/O interface are arranged on the fourth side.

7. The processor module of claim 4, further comprising a first substrate including a first side and a second side, wherein the first processor assembly and the second processor assembly are arranged on the first side and the second side in a sandwich configuration.

8. The processor module of claim 7, wherein:
the first processor assembly further comprises a second substrate including a third side, wherein the first processor, the first I/O interface, the second processor, and the second I/O interface are arranged on the third side; and
wherein the second processor assembly further comprises a third substrate including a fourth side, wherein the third processor, the third I/O interface, the fourth processor, and the fourth I/O interface are arranged on the fourth side.

9. The processor module of claim 4, wherein the first and second processors are the same type of processor.

10. The processor module of claim 9, wherein the third and fourth processors are different types of processors using the same software.

11. The processor module of claim 4, wherein the first, second, third, and fourth processors are the same type of processor.

12. The processor module of claim 4, wherein the first and second processors are different types of processors using the same software.

13. The processor module of claim 12, wherein the third and fourth processors are different types of processors using the same software.

14. The processor module of claim 4, wherein the first, second, third, and fourth processors are each different types of processors using the same software.

15. The processor module of claim 4, wherein the first and second processor assemblies are self-monitoring, self-activating processor assemblies.

16. The processor module of claim 15, wherein the first, second, third, and fourth processors are self-monitoring, self-activating processors.

17. A processor assembly, comprising:
a first processor;
a second processor;
a first input/output (I/O) interface coupled to the first processor and the second processor;
a second I/O interface coupled to the first processor and the second processor, wherein the first I/O interface, the second I/O interface, or both are configured to:
  compare outputs of the first and second processors, and
  render the first and second processors inactive if the outputs are different; and
a substrate, wherein the first processor, the first I/O interface, the second processor, and the second I/O interface are arranged on a same side of the substrate.

* * * * *